March 4, 1924.                B. C. SWINEHART                1,485,573
                                    TIRE
                             Filed Dec. 2, 1920

B. C. SWINEHART
INVENTOR

BY F. E. Shannon
ATTORNEY

Patented Mar. 4, 1924.

1,485,573

UNITED STATES PATENT OFFICE.

BENJAMIN C. SWINEHART, OF AKRON, OHIO.

TIRE.

Application filed December 2, 1920. Serial No. 427,771.

*To all whom it may concern:*

Be it known that I, BENJAMIN C. SWINE-HART, a citizen of the United States, residing at Akron, in the county of Summit and State of Ohio, have invented new and useful Improvements in Tires, of which the following is a specification.

This invention relates to certain new and useful improvements in tires for wheels and has particular relation to a tire of the so called cushion type which is particularly adapted for use on the wheels of automobiles, motor trucks or other vehicles.

It is an object of this invention to provide a strong, durable tire of simple, economical construction which will possess great resiliency and which when applied to a vehicle will provide an efficient cushion therefor.

A further object is to provide a tire of rubber or other elastic or resilient material having a circumferentially extending series of laterally directed openings therein. The said openings being designed to provide a tire which is more easily compressible and which will therefore more readily absorb the shock and jar occasioned by the progress of a vehicle over a rough uneven surface.

A further object is to provide a cushion body of rubber or similar material which is rendered more resilient by having passages in the body thereof, the passages being designed to limit undue compression and being of a cross sectional contour that will prevent tearing of the material adjacent thereto.

The above and additional objects are accomplished by the novel construction, and arrangement herein described and illustrated in the accompanying drawing, which forms a part hereof and in which I have shown a preferred embodiment of the invention, it being understood that the invention is capable of various adaptations and that changes and modifications may be made or substitutions resorted to which come within the scope of the claims hereunto appended.

In the drawings in which similar numerals of reference are employed to designate similar or like parts:—

Figure 1:
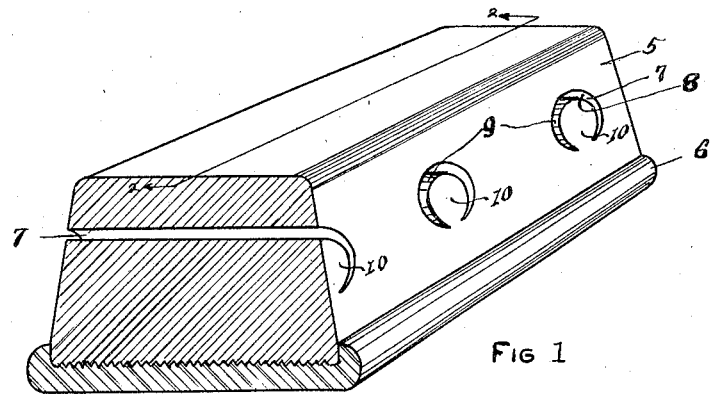
Figure 1 is a perspective view of a portion of a cushioned tire constructed in accordance with this invention and also illustrating the same in transverse section.

Referring now to the drawings in detail, the numeral 5 is used generally to denote an annular tire body of rubber, rubber composition or other elastic or resilient material which is vulcanized to or otherwise secured on a suitable annular rim 6 which may be of ordinary or improved construction. The tire body 5 is provided with a circumferentially extending series of laterally directed openings 7 which, in the adaptation of the invention illustrated in the drawings, extend therethrough in parallel relation to the axis of a tire. Each opening 7 is formed of substantially lunate cross section having a wall 8 which presents a surface conforming in contour to the interior surface of a cylinder and a wall 9 which presents a surface of less area and conforms in contour to the exterior surface of a relatively smaller cylinder. The cylindrical surfaces 8 and 9 are eccentrically arranged in respect to each other and meet at an acute angle at each side of the opening 7, thus forming a crescentic bore 7. The bore thus almost surrounds a laterally directed cylinder portion 10 which is integral with the tire body 5. It will thus be seen, that I have provided a cushion which, for the purpose of description, may be defined as comprising a body of elastic material provided with cylindrical bores 7 into each of which is eccentrically fixed a cylinder 10 of smaller diameter, the said cylinder being integral with the material surrounding the bore 7.

Figure 2:
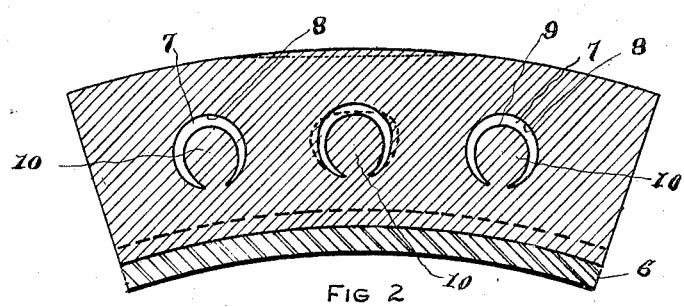
Figure 2 is a longitudinal sectional view of same taken on line 2—2 of Figure 1.
Figure 3:
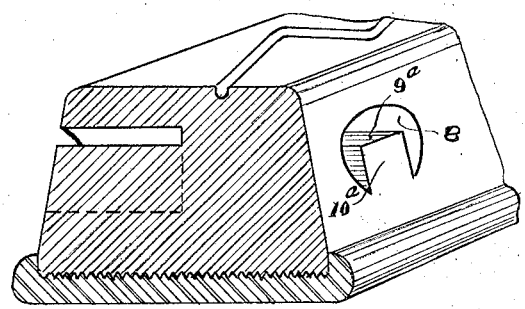
Figure 3 is a perspective view of a portion of a tire showing a modification of the invention.

In Figure 3, I have illustrated a modification of the invention and have shown the bores extending into the tire body from each lateral side thereof. In this adaptation the bores 7 terminate in spaced relation from the opposite lateral side of the tire and the bores on one side are alternately arranged in respect to those on the other side thereof. In this modification of the invention the interior surface 8 of the bore 7 conforms substantially to the interior surface of the bores in the structure shown in Figures 1 and 2. The portion 10$^a$ conforms to the cylindrical portion 10; it being substantially rectangular in cross sectional contour and being provided with a flat surface 9$^a$ which is arranged to contact with the surface 8 when the tire is under a heavy load. I have also disclosed a circumferentially extending zig-zag groove 11 which is formed on the periphery of the tire so as to render the portion of the tire lying between the bores 7 more easily compressible and consequently more resilient.

A tire constructed in accordance with this invention, when carrying a heavy load or when subjected to a local shock by being brought into forced contact with a stone, a curb or other relatively sharp objects will readily yield thereto and the concave wall 8 of the opening 7 will be forced against the convex wall 9 thereof. If the load or shock is sufficient to further compress the tire body, the force will then be additionally cushioned by the cylinder portion 10 which, although possessed of great resiliency, will limit the compressibility of the cushion body 5 and prevent the opening 7 from being entirely closed, thus eliminating the danger of tearing or breaking of the tire body at the extremities of said openings.

In Figure 2 I have shown by dotted lines a local compression of the tire body 5 and have illustrated the opposite walls of one of the openings, in contact as a consequence thereof. It will be obvious that a further compression of the body will cause a flattening of the portion 10 which may be forced inwardly so as to close the opposite extremities of the opening 7 without subjecting its walls to a sharp bend, thus avoiding injury to the material of which the tire body is composed.

If desired, the cross sectional shape of said bores and of the portion 10 may be varied to produce various adaptations of this invention.

Having thus described my invention what I claim as new and desire to secure by Letters Patent is:—

1. A cushion tire comprising an elastic body provided with a circumferentially extending series of openings which extend laterally therethrough, each opening having an outer wall which conforms to the interior surface of a cylinder and an inner wall which conforms to the exterior surface of a relatively smaller cylinder, the said surfaces being eccentrically arranged to provide an opening having oppositely disposed knife-like extremities.

2. A cushion tire comprising an annular elastic body provided with a circumferentially extending series of laterally directed openings which are formed therein in spaced, parallel relation to each other and in parallel relation to the axis of the tire, each opening having an outer wall which conforms to the interior surface of a cylinder and an inner wall which conforms to the exterior surface of a relatively smaller cylinder, the said surfaces being eccentrically arranged to meet at an acute angle at the extremities of the opening.

3. A cushion tire comprising an annular elastic body provided with a circumferentially extending series of laterally directed openings arranged therein so as to make the body more readily compressible, the walls of each of said openings meeting at an acute angle at the opposite extremities thereof, a portion of the tire body protruding into said openings, so as to support the opposite walls of the openings when the tire is subjected to compression.

4. A cushion tire comprising an annular elastic body provided with a circumferentially extending series of crescentic bores which extend laterally therein in spaced, parallel relation to each other and in parallel relation to the axis of the tire, the walls of said openings meeting at an acute angle at the opposite extremities thereof.

5. A tire comprising a metallic rim and a body of elastic material vulcanized thereto, said body having a circumferentially extending series of laterally directed crescentic openings arranged therein so that the opposite extremities of each opening will be equidistant from a radius of the tire passing through the center of the openings, the opposite walls of each opening meeting at an acute angle at the opposite extremities thereof.

6. A cushion tire comprising a body of elastic material provided with a plurality of laterally directed cylindrical bores into each of which is eccentrically fixed a cylinder of smaller diameter the cylinder being integral with said body, the wall of the cylinder meeting the wall of the bore at an acute angle.

In testimony whereof I have hereunto set my hand.

BENJAMIN C. SWINEHART.